United States Patent [19]

Jaumann et al.

[11] Patent Number: 4,657,267

[45] Date of Patent: Apr. 14, 1987

[54] MOTION PICTURE OR TELEVISION CAMERA STAND

[75] Inventors: Leonhard Jaumann, München; Helmut Kus, Ottobrunn, both of Fed. Rep. of Germany

[73] Assignee: Sachtler GmbH Filmtechnische Geraete, Garching, Fed. Rep. of Germany

[21] Appl. No.: 777,168

[22] Filed: Sep. 18, 1985

[30] Foreign Application Priority Data

Sep. 19, 1984 [DE] Fed. Rep. of Germany ....... 3434386

[51] Int. Cl.$^4$ .............................................. G03B 17/00
[52] U.S. Cl. ............................. 280/47.11; 280/79.1 A; 354/81; 352/243; 248/170
[58] Field of Search ............ 280/47.11, 47.34, 79.1 R, 280/79.1 A; 354/81, 293, 294; 352/243; 248/129, 170

[56] References Cited

U.S. PATENT DOCUMENTS 2,613,083 10/1952 Moludy ........................ 280/79.1 A
2,661,672 12/1953 Fairbanks .............................. 354/81
4,095,250 6/1978 Giglioli ............................... 354/293

Primary Examiner—John J. Love
Assistant Examiner—Donn McGiehan
Attorney, Agent, or Firm—Felfe & Lynch

[57] ABSTRACT

A motion picture or television camera stand is disposed on a running support consisting of a central body with three arms. The arms are provided each on their free ends with a set of wheels, the wheels being steerable through a central steering system which has a steering wheel disposed around the central column of the stand and fastened thereon, an upper central cogwheel mounted on the central column, a steering shaft rotatably mounted on the central column and extending parallel to the latter, with a pinion on its upper end cooperating with the upper central cogwheel and a pinion on its lower end cooperating with the lower pinion of the steering shaft in the central body of the support and one cogbelt drive from the lower central cogwheel to each cogwheel on the shafts bearing the running wheel sets. The stand is made to be removable from the support. Two of the arms of the support are foldable against the third arm.

11 Claims, 4 Drawing Figures

MOTION PICTURE OR TELEVISION CAMERA STAND

BACKGROUND OF THE INVENTION

The invention relates to a motion picture or television camera stand on a running support.

Stands of this kind, which are also called pedestals, are known. They are, however, relatively bulky and therefore not easily transportable.

A support or dolly which has swivel arms is already commercially available. It has no central steering, however, and instead only the wheel set (i.e., normally a single wheel or twin wheels) of one of the dolly arms is steerable, namely by an extension handle on the shaft bearing this wheel set. To operate this stand at least two persons are necessary, namely, in addition to the camera man, a helper to push and steer the dolly.

It is an object of the invention to create a stand or pedestal on a running support or dolly, which has central steering and nevertheless is easily transportable, that is, especially one which can be operated by the camera man alone.

SUMMARY OF THE INVENTION

A camera stand on a running support comprises: a central body with three arms which are provided each with a set of one or more wheels on their free ends, the running wheels being steerable through a central steering system comprising a central column of the stand, a steering wheel disposed around the central column of the stand and fastened thereon, an upper central sprocketwheel mounted on the central column, a steering shaft rotatably mounted on the central body and extending parallel to the latter and having a pinion on the upper end cooperating with the upper central sprocketwheel and having a lower pinion on the bottom end, a lower central sprocketwheel on the central body of the support cooperating with the lower pinion on the steering shaft, a sprocketwheel on each of the shafts bearing the running wheel sets, and one sprocketwheel drive from the lower central sprocketwheel to the sprocketwheel on the shafts bearing the running wheel sets, the stand being removable from the support and two of the arms of the support being foldable against the third arm.

BRIEF DESCRIPTION OF THE DRAWINGS

An embodiment of the invention is further explained below with the aid of the drawing, wherein.

DESCRIPTION OF A PREFERRED EMBODIMENT

As used herein and in the claims, the term "sprocketwheel" includes a cogwheel, a toothed member, a gear and the like.

Figure 1:
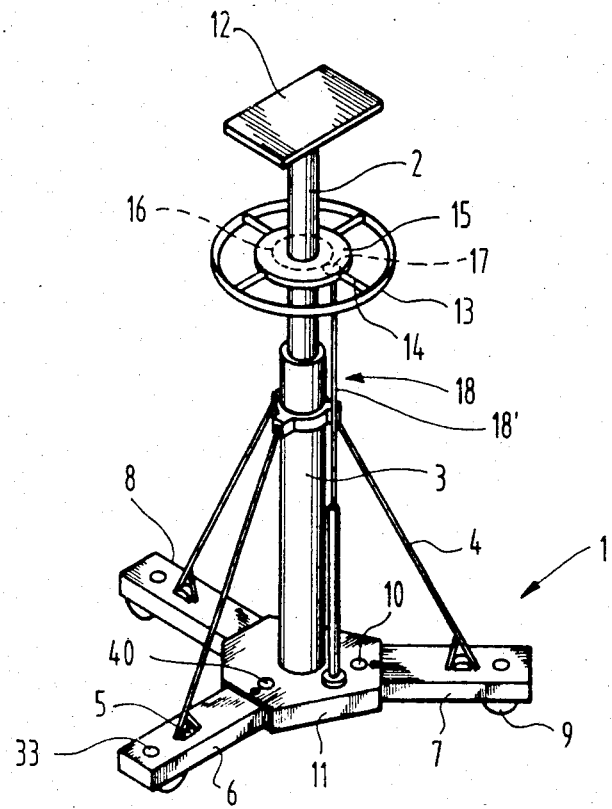
FIG. 1 is a diagrammatic, perspective representation of a motion picture or television camera stand on a running support.

According to FIG. 1, a stand or pedestal for a motion picture or television camera is disposed on a support or dolly 1. The stand has a vertical central column 2 which is disposed for telescoping in a support body 3.

Three stand legs 4 are pivoted on the support body 3, with their points each engaging a socket means 5 disposed on each of the three dolly arms 6, 7 and 8. The socket means can be made in the manner of the ground spider according to German Federal Pat. No. 26 12 409, i.e., each stand leg 4 has two prongs of which one extends in prolongation of the stand leg and the other runs inward at an angle of about 45°, a roller having a circumferential cover supporting and guiding both prongs of a stand leg 4. The prongs are furthermore securable by a clamping means. The clamping means is a U-shaped loop of rubber-elastic material whose arms straddle the axis of the roller, and whose central portion, in the form of a handle, can be clamped about an outwardly pointing clamping means at the bottom end of each stand leg 4.

The dolly arms 6, 7 and 8 are each provided with a wheel set 9 on their free end, these being twin wheels for example. Two of the dolly arms, namely dolly arms 6 and 7, are each pivotable about vertical axes 10 on the central body 11 of the dolly 1, while the third dolly arm 8 is rigidly affixed to the body 11.

At its upper end the central column 2 is provided with a mounting device 12 for the camera, and under the mounting device it is provided with a steering wheel 13.

The steering wheel 13 is fastened by spokes 14 to a hub 15 on the central column 2. Furthermore, as represented in broken lines in FIG. 1, there is an upper central gear 16 on the central column 2, and this gear meshes with a pinion 17 or is connected by a cogbelt to the pinion 17. The pinion 17 drives a steering shaft 18 which, as not indicated in detail in the drawing, is mounted on the central column 2 and extends parallel to the central column 2 into the central body 11. The steering shaft 18 is capable of telescoping like the central column 2.

Figure 2:
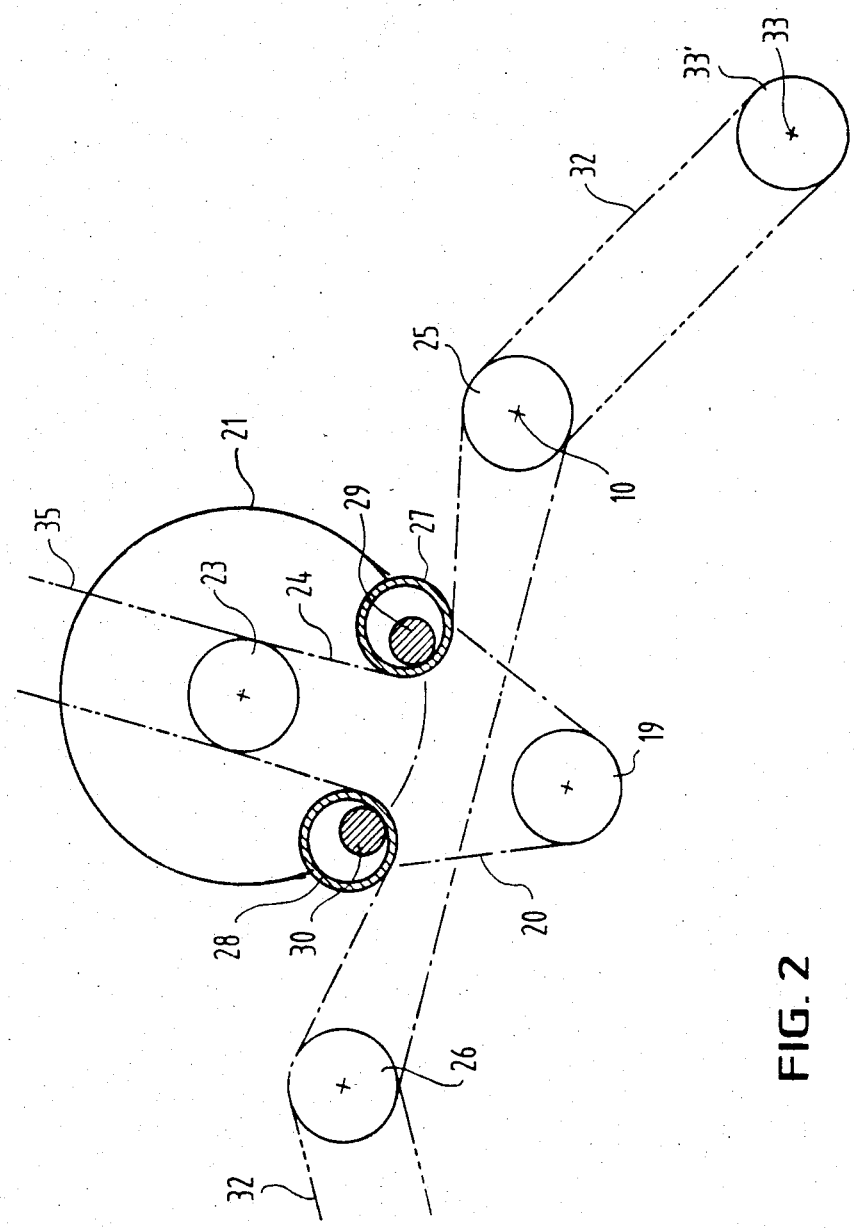
FIG. 2 is a diagrammatic plan view of the parts of the central steering which are disposed in the central body of the support.
Figure 3:
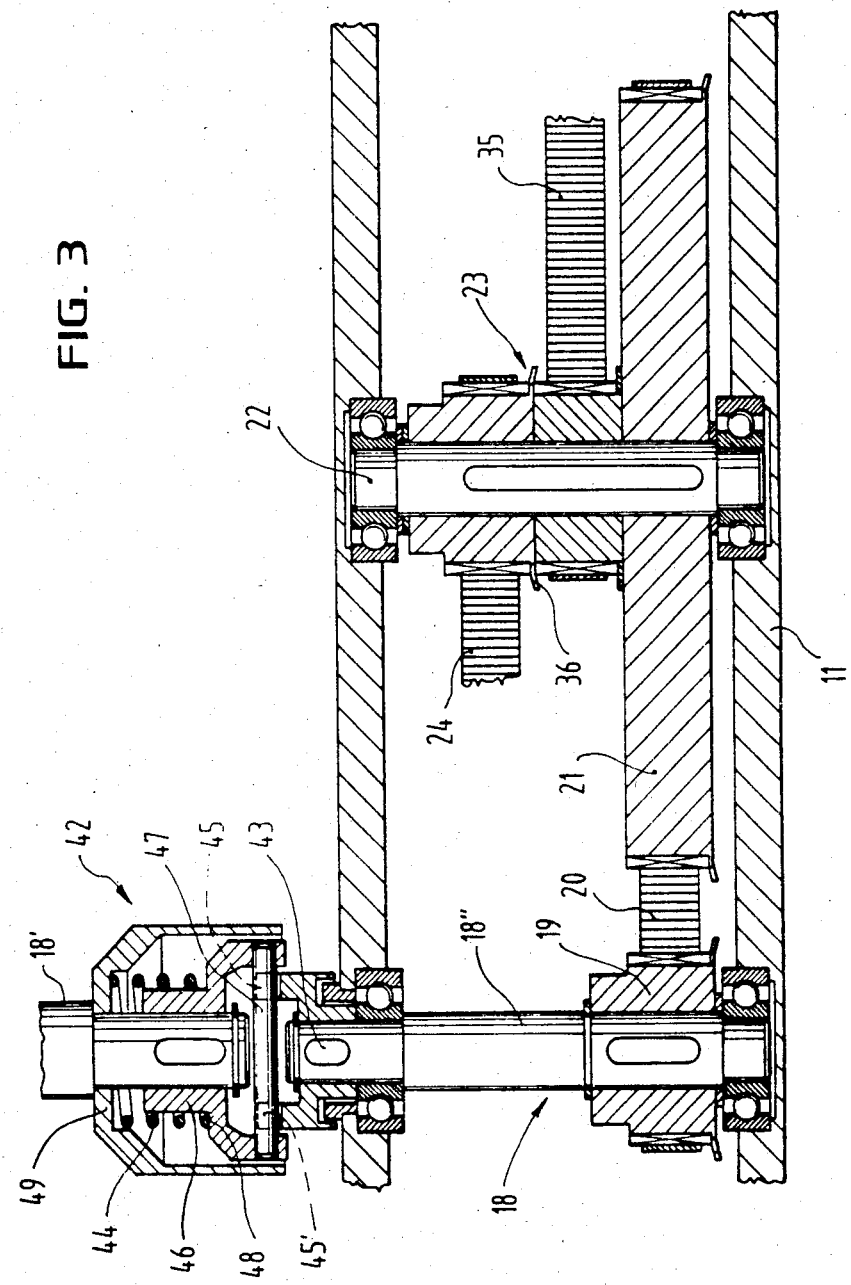
FIG. 3 is a vertical cross section taken through a portion of the central body of the support.

As can be seen in FIGS. 2 and 3, at the bottom end of the steering shaft 18 there is another pinion 19 which through a cogbelt 20 drives a bottom central cogwheel 21 which is coaxial with the upper central cogwheel 16 and is mounted for rotation on a shaft 22 in the central body 11 of the dolly 1. The steering shaft 18 is disposed on the central body 11 of the dolly 1, on the side of the central column 2 opposite the fixed arm 8.

Figure 4:
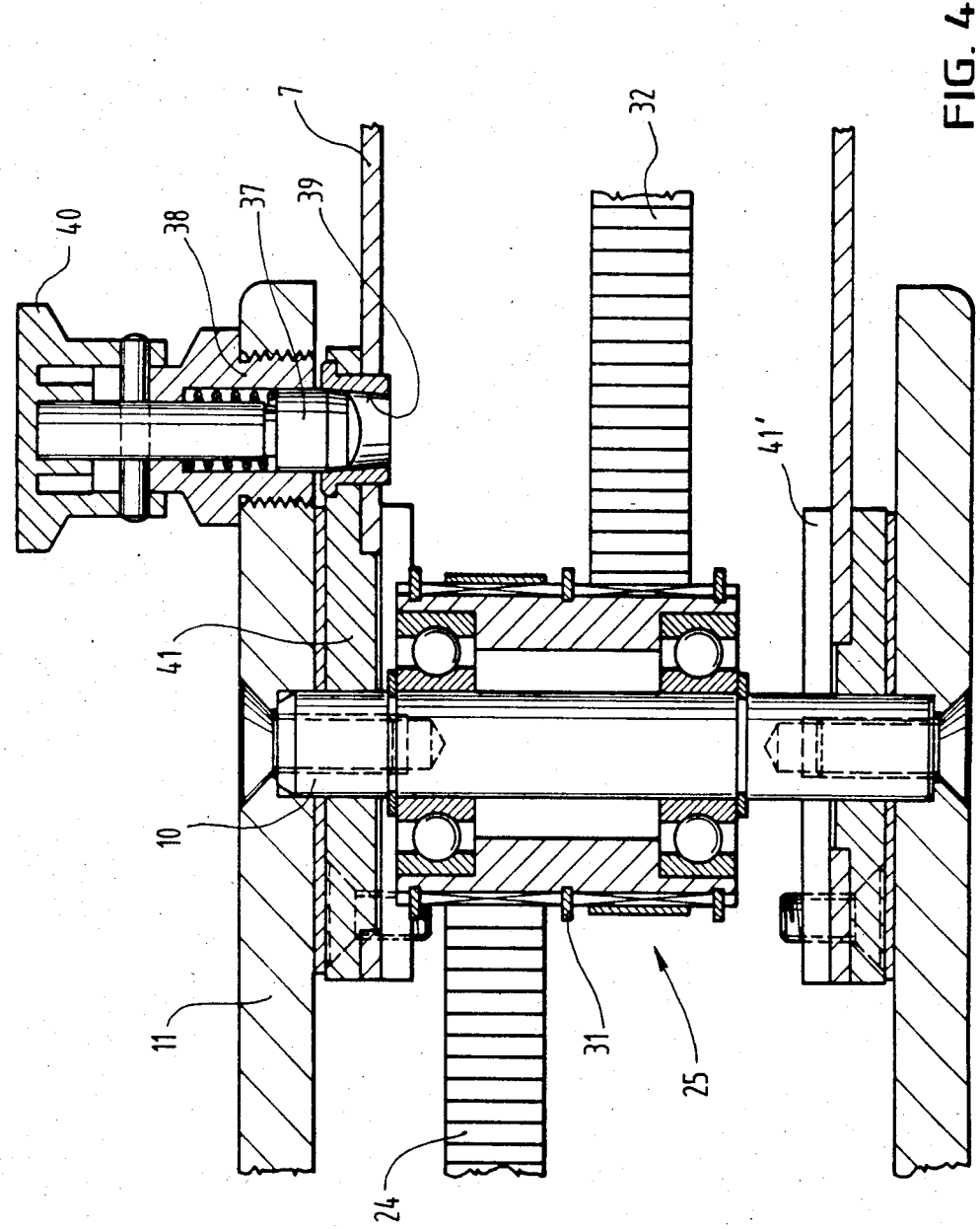
FIG. 4 is a vertical cross section through the portion of the support on which one of the swivel arms is pivoted.

On the shaft 22 of the lower central cogwheel 21 there is fastened an additional cogwheel 23 around whose upper part a cogwheel 24 passes, which passes around two more cogwheels 25 and 26 in addition to cogwheel 23, as can be seen in FIGS. 2 and 4.

Each of the cogwheels 25 and 26 is situated on one of the vertical pivot shafts 10, by which the dolly arms 6 and 7 are pivoted on the central body 11. As can be seen in FIG. 2, the cogbelt 24 is configured in plan approximately in the form of a triangle, with the cogwheel 23 on the bottom central cogwheel 21 and the cogwheels 25 and 26 on the two pivot shafts 10 at the apexes of the triangle.

On the cogbelt section between the cogwheel 23 on the lower central cogwheel and each of the two cogwheels 25 and 26 on the pivot shafts 10 there is furthermore provided a wheel 27 and 28, respectively, for tightening the cogbelt 24, each wheel being rotatably mounted on a cam 29 and 30, respectively, which are rotatably mounted on the central body 11 and can be fixed at the desired angular position (FIG. 2).

The working range of the cogbelt 24 on the cogwheels 25 and 26 is restricted by a ring 31 (FIG. 4). On the bottom part of each cogwheel 25 and 26, on the pivot shafts 10 of the pivoted dolly arms 6 and 7 there is another cogbelt 32 which runs to a cogwheel 33' (represented in FIG. 2 only for the arm 7), which is mounted on the free end of the shaft rotatably mounted on the dolly arms 6 and 7 on which the wheel sets 9 are provided (FIG. 1). An additional cogwheel 34 is provided for the cogbelt 32 at the bottom end of each cogwheel 25 and 26.

Each pivot axis 10 is formed by a vertical shaft fastened to the central body, which passes through the body end of the box-like dolly arms 6 and 7, respectively. The cogwheels 24 and 25 are rotatably mounted on the shaft 10 (FIG. 4).

The steering of the wheel set 9 of the fixed, nonpivoted dolly arm 8 is performed through a cogbelt 35, which passes around the bottom part of the cogwheel 23 disposed on the bottom central cogwheel 21 on the one hand, and around a cogwheel (not represented in the drawing) which is mounted on the shaft 33 at the free end of the fixed dolly arm 8 which bears the wheel set 9. A guard 36 between the upper and lower part of the cogwheel 23 disposed on the central cogwheel 21 serves to keep separate from one another the cogbelt 24 for steering the wheel sets of the two pivoted arms 6 and 7 and the cogbelt 35 for steering the wheel set 9 of the fixed, nonpivoted dolly arm 8 (FIG. 3).

To enable direct steering to be performed, i.e., to have a 1:1 transmission ratio between the steering wheel 13 and the shafts 33 bearing the wheel sets 9, the transmission ratio between the gear 19 at the bottom end of the steering shaft 18 and the lower central cogwheel 23 is the same as the transmission ratio between the upper central cogwheel 16 and the gear 19 on the upper end of the steering shaft 18. Furthermore, the transmission ratio between the cogwheel 23 disposed on the lower central cogwheel 21 and the cogwheels 33' (represented in FIG. 2 only in the case of arm 7) on the shafts 33 bearing the wheel sets is 1:1 in each case.

To lock up the two arms 6 and 7 of the dolly in the opened-up position, there is provided in each case a plunger 37 which is displaceable parallel to the pivot axis 10 in a sleeve disposed on the central body 11 at the end of the central body 11 facing the free end of the arms 6 and 7 and can be engaged in a bore 39 in the corresponding arm 6 or 7. At its upper end the plunger 37 is provided with a knob 40. Furthermore, in the area of the pivot axis 10 each of the pivoted, box-like arms 6 and 7 is provided top and bottom with a reinforcement 41 and 41', respectively.

To enable the two arms 6 and 7 to be withdrawn against the nonpivoting, fixed arm 8 of dolly 1, the stand is made so as to be removable from the dolly 1, i.e., releasable without the use of a tool.

For this purpose, on the one hand the above-described socket means 5 are provided, and on the other hand the steering shaft 18 is divided into an upper part 18' with the pinion 17 cooperating with the upper central cogwheel 17, and a lower part 18" with the cogwheel 19 cooperating with the lower central cogwheel 21. The bottom part 18" of the steering shaft, which bears the pinion 19, is rotatably mounted in the central body 11 of the dolly 1.

The two parts 18' and 18" of the steering shaft 18 can be joined together by means of a quick coupling 42. The quick coupling is formed by a claw 43 on the upper end of the lower part 18" of the steering shaft 18, and a sleeve 46 which is disposed displaceably on the bottom end of the upper part 18' of the steering shaft 18 and is biased by a spring 44, and which bears a pin 47 engaging the notches 45 and 45' in the claw. The spring 44 is supported at one end on an outer shoulder 48 of the sleeve 46 and at the other end on a cap 49 which extends over the sleeve 46 and is fastened to the steering shaft 18.

The stand removed from the dolly 1 and the dolly 1 with arms 6 and 7 swung back against the arm 8 are easily transportable, in the trunk of a car, for example, or in the form of aircraft luggage. To be able to transport the stand even more compactly, it has furthermore been found practical to make the steering wheel 13 with the spokes 14 removable, e.g., by fastening the spokes 14 to the hub 16 with a nondisplaceable wing bolt which cooperates with a fast-centering, unlosable nut.

The above-described cogbelt drives can be replaced in whole or in part also by other transmissions for the positive transmission of torque, especially by a chain drive, in the form, for example, of a toothed chain or roller chain, in which case the cogwheels are replaced by chain sprockets. Furthermore, gear transmissions with intermeshing gears can be used, especially for the transmission of torque from the steering wheel 13 to the steering shaft 18 and from the steering shaft 18 to the shaft 22 disposed in the central body of the dolly, coaxial with the steering wheel 13.

While there has been described what is at present considered to be the preferred embodiment of the invention, it will be obvious to those skilled in the art that various changes and modifications can be made therein without departing from the invention, and it is, therefore, aimed to cover all such changes and modifications as fall within the true spirit and scope of the invention.

What is claimed is:

1. A camera stand comprising a running support having: a central body with three arms which are provided each with a set of one or more wheels on their free ends, the running wheels being steerable through a central steering system comprising a stand having a central column, a steering wheel disposed around the central column of the stand and fastened thereon, an upper central sprocketwheel mounted on the central column, a steering shaft rotatably mounted on the central body and extending parallel to the latter and having a pinion on the upper end cooperating with the upper central sprocketwheel and having a lower pinion on the bottom end, a lower central sprocketwheel on the central body of the support cooperating with the lower pinion on the steering shaft, a sprocketwheel on each of the shafts bearing the running wheel sets, and one sprocketwheel drive from the lower central sprocketwheel to the sprocketwheel on the shafts bearing the running wheel sets, the stand from the support and two of the arms of the support being foldable against the third arm.

2. A camera stand according to claim 1, in which the steering shaft is in two upper and lower parts, and in which the removing means includes a quick coupling, the upper part having the pinion that cooperates with the upper central sprocketwheel being connected by the quick coupling to the lower part which is rotatably mounted on the central body of the support and has the pinion which cooperates with the lower central sprocketwheel.

3. A camera stand according to claim 2, in which the quick coupling comprises a claw on the upper end of the lower part of the steering shaft and a sleeve which is displaceably disposed on the lower end of the upper part of the steering shaft, is spring-biased against the claw, and has a pin engaging the claw.

4. A camera stand according to claim 1, which is a tripod stand which has tripod legs having prongs and in which the arms of the support have socket means for the prongs of the tripod legs.

5. A camera stand according to claim 2, in which the sprocketwheel drive from the lower central sprocketwheel to the sprocketwheels on the shafts of the wheel sets of the two foldable arms of the support comprises in each case a sprocketwheel coaxial with a pivot axis which is connected to the sprocketwheel on a shaft of a running wheel set by a drive, as well as by an additional drive which passes around a sprocketwheel coaxial with the lower central sprocketwheel as well as the two coaxial sprocketwheels.

6. A camera stand according to claim 1, in which, between the steering wheel and the shafts bearing the running wheel sets on the arms of the support, there is a transmission ratio of 1:1.

7. A camera stand according to claim 6, in which the transmission ratio between the pinion at the bottom end of the steering shaft and the lower central sprocketwheel is the same as the transmission ratio between the upper central sprocketwheel and the pinion on the upper end of the steering shaft.

8. A camera stand according to claim 7, which includes a sprocketwheel disposed on the lower central sprocketwheel and in which the transmission ratio between the sprocketwheel disposed on the lower central sprocketwheel and the sprocketwheels on the shafts bearing the running wheel sets is 1.1.

9. A camera stand according to claim 8, which includes tightening rollers on the sections of a drive between the sprocketwheel disposed on the lower central sprocketwheel and each of two sprocketwheels disposed on the pivot axes.

10. A camera stand according to claim 9, which includes a sprocketwheel disposed on the shaft of the wheel set of the third arm and which includes a drive which passes around the sprocketwheel disposed on the lower central sprocketwheel as well as the sprocketwheel disposed on the shaft of the wheel set of the third arm.

11. A camera stand according to claim 1, which includes, for the locking of the deployed position of two arms of the support, for each of the two arms a plunger which is disposed displaceably parallel to the pivot axis on the end of the central body facing the free end of the arm and can be engaged in a bore in the arm.

* * * * *

UNITED STATES PATENT AND TRADEMARK OFFICE
CERTIFICATE OF CORRECTION

PATENT NO. : 4,657,267
DATED : April 14, 1987
INVENTOR(S) : Leonhard Jaumann, et al.

It is certified that error appears in the above-identified patent and that said Letters Patent is hereby corrected as shown below:

Column 4, line 60 -- means for removing -- should be inserted before "the stand".

Column 6, line 9 "1.1" should be -- 1:1 --.

Signed and Sealed this

Twenty-seventh Day of December, 1988

Attest:

DONALD J. QUIGG

Attesting Officer

Commissioner of Patents and Trademarks